United States Patent
Patel

(10) Patent No.: US 6,246,435 B1
(45) Date of Patent: Jun. 12, 2001

(54) IN-SERVICE REALTIME PICTURE QUALITY ANALYSIS

(75) Inventor: Kamalesh U. Patel, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/149,409

(22) Filed: Sep. 8, 1998

(51) Int. Cl.[7] ................................................. H04N 17/00
(52) U.S. Cl. ........................ 348/192; 348/180; 348/519
(58) Field of Search .................... 348/192, 193, 348/180, 177, 461, 466, 465, 474, 519

(56) References Cited

U.S. PATENT DOCUMENTS

| | | | |
|---|---|---|---|
| 2,885,470 | * | 5/1959 | Bartelink ............................... 348/192 |
| 4,682,246 | * | 7/1987 | Efron et al. ........................... 348/189 |
| 5,260,788 | * | 11/1993 | Takano et al. ........................ 348/478 |
| 5,446,492 | * | 8/1995 | Wolf et al. ............................ 348/180 |
| 5,694,174 | * | 12/1997 | Suzuki ................................... 348/518 |
| 5,764,284 | * | 6/1998 | Stoker ................................... 348/192 |
| 5,920,572 | * | 6/1999 | Washington et al. ................. 348/476 |
| 5,940,124 | * | 8/1999 | Janko et al. .......................... 348/192 |

* cited by examiner

Primary Examiner—Reinhard J. Eisenzopf
Assistant Examiner—Trang U. Tran
(74) Attorney, Agent, or Firm—Francis I. Gray

(57) ABSTRACT

An in-service, realtime picture quality analysis method determines the degradation of a test video signal at a test point with respect to a reference video signal by generating from the reference video signal a set of parameters that characterize the images represented by the reference video signal. The set of parameters are inserted into a transport stream that also has an encoded version of the reference video signal. At the test point the set of parameters is extracted from the transport stream, and the test video signal is decoded from the transport stream. A corresponding set of parameters is generated for the test video signal, and the two sets of parameters are compared by a picture quality analysis algorithm to produce a picture quality rating that represents the degradation of the test video signal.

4 Claims, 1 Drawing Sheet

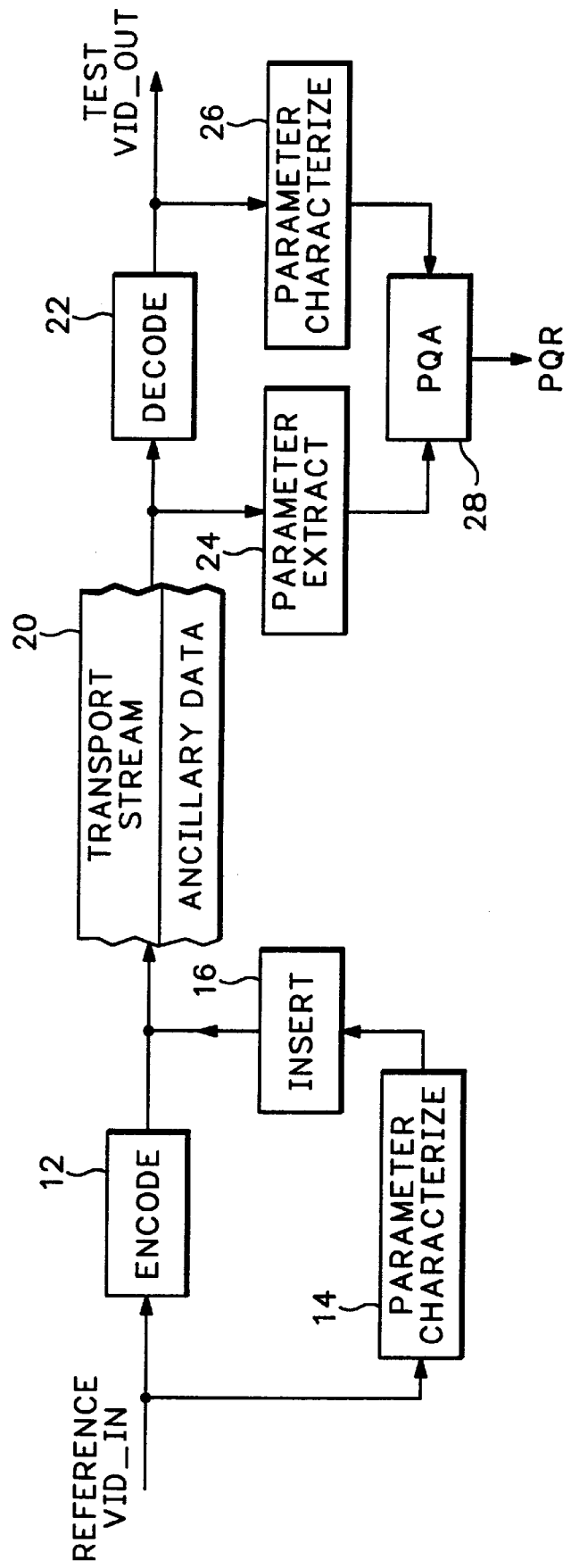

IN-SERVICE REALTIME PICTURE QUALITY ANALYSIS

BACKGROUND OF THE INVENTION

The present invention relates to the analyzing of the quality of transmitted video images, and more particularly to an in-service, realtime picture quality analysis method that does not require a broadband reference video signal at a test point.

Currently picture quality measurements are based upon a full bandwidth picture differencing method using a human vision model algorithm, such as the Sarnoff Corporation JNDmetrix™ algorithm. In this method a reference (original) video signal is compared against a test (impaired) video signal. This requires the full bandwidth reference and test video signals to be available at a test point in order to perform picture quality analysis.

There are two ways the reference video signal may be made available at the test point:

1. Pre-storing the reference video signal on the test system—this requires prior knowledge of reference video scenes which limits its usefulness to out-of-service and non-realtime applications; and
2. Sending the reference video signal to the test point over a low bandwidth data link—this requires a dedicated data link to transport the reference video signal to the test point on demand as well as posing bandwidth limitation issues, and therefore is not useful for real-time picture quality analysis.

What is desired is a method of picture quality analysis that may be performed real time while the system under test is in-service.

SUMMARY OF THE INVENTION

Accordingly the present invention provides an in-service, realtime picture quality analysis method by comparing parameters that characterize the reference video signal with the same parameters for the test video signal. The reference video signal is input to a compression encoder and to a parameter characterization module. Specific parameters are extracted from the reference video signal and input to a parameter insertion module. The parameter insertion module inserts the parameters as ancillary data in the compressed data transport stream from the compression encoder. At the test point the transport stream is input to a compression decoder to recover the test video signal, and also is input to a parameter extraction module that extracts the transmitted parameters from the ancillary data. The test video signal is input to a parameter characterization module like the one at the transmission end and the same parameters are generated for the test video signal that correspond to the extracted parameters. These two sets of parameters are then input to a picture quality analyzer module for comparison, and any differences are reported as a picture quality rating.

The objects, advantages and other novel features of the present invention are apparent from the following detailed description when read in conjunction with the appended claims and attached drawing.

BRIEF DESCRIPTION OF THE SEVERAL VIEWS OF THE DRAWING

The FIGURE is a block diagram view of a system for performing in-service, realtime picture quality analysis according to the present invention.

DETAILED DESCRIPTION OF THE INVENTION

Referring now to the FIGURE a broadband video signal VID_IN is input to a compression encoder 12, and is referred to as a reference video signal. The compressed video signal from the encoder 12 is transmitted via a transport stream 20 to a test point where it is input to a compression decoder 22. The output from the decoder 22 is an impaired or test video signal VID_OUT. The reference video signal also is input to a parameter characterization module 14 where certain parameters that are useful in defining the image represented by the reference video signal are generated. Such parameters may include spatial energy, temporal energy, frequency signature or the like. The parameter characterization module 14 may use one or more filters to generate the parameters, as is well known in the art. The parameters are then input to a parameter insertion module 16 which inserts the parameters as ancillary data into the transport stream 20.

At the test point the transport stream is input to a parameter extraction module 24 to extract the parameters for the reference video signal from the ancillary data. The test video signal from the decoder 22 is input to another parameter characterization module 26 that generates the same parameters for the test video signal as were generated for the reference video signal. The reference parameters from the parameter extraction module 24 and the test parameters from the parameter characterization module 26 are input to a picture quality analyzer module 28 for comparison with each other. The picture quality analyzer module 28 provides a picture quality rating PQR that represents the degradation of the test video signal with respect to the reference video signal.

For realtime analysis a relatively simple set of parameters is selected that doesn't require a lot of computation, i.e., the filters can run in real time. Thus only simple numbers are transmitted in the ancillary data, avoiding the bandwidth limitation as well as the realtime limitation. As a result the picture quality analysis algorithm implemented by the picture quality analyzer module 28 may be simpler to run in real time, as opposed to the JND algorithm used for comparing broadband video signals as in the prior art. For example the picture quality analysis algorithm may be as simple as a differencing circuit with thresholding.

Thus the present invention provides an in-service, real-time picture quality analyzer method by generating parameters from the reference video signal, transmitting them in the same transport stream with the encoded reference video signal, and then comparing them with the same parameters generated from the test video signal decoded at a test point to produce a picture quality rating.

What is claimed is:

1. An in-service, realtime picture quality analysis method of measuring degradation of a test video signal at a test point with respect to a reference video signal comprising the steps of:

generating from the reference video signal a set of parameters that characterize the images represented by the reference video signal;

inserting the set of parameters into a transport stream containing an encoded version of the reference video signal for transmission to the test point;

extracting at the test point the set of parameters from the transport stream;

generating at the test point from the test video signal a corresponding set of parameters, the test video signal being a decoded version of the reference video signal derived from the transport stream; and comparing the two sets of parameters to produce a picture quality rating that represents the degradation of the test video signal with respect to the reference video signal.

2. An in-service, realtime picture quality analyzer for measuring degradation of a test video signal at a test point with respect to a corresponding reference video signal comprising:

- means for generating from the reference video signal a set of parameters that characterize the images represented by the reference video signal;
- means for inserting the set of parameters into a transport stream containing an encoded version of the reference video signal for transmission to the test point;
- means for extracting at the test point the set of parameters from the transport stream;
- means for generating at the test point from the test video signal a corresponding set of parameters, the test video signal being a decoded version of the reference video signal derived from the transport stream; and
- means for comparing the two sets of parameters to produce a picture quality rating that represents the degradation of the test video signal with respect to the reference video signal.

3. An in-service, realtime picture quality analyzer for measuring degradation of a test video signal at a test point with respect to a reference video signal comprising:

- a transmission parameter characterization module having as input the reference video signal and as output a set of parameters that characterize the images represented by the reference video signal;
- a parameter insertion module having as input the set of parameters, the parameter insertion module inserting the set of parameters into a transport stream containing an encoded version of the reference video signal;
- a parameter extraction module at the test point having as input the transport stream and as output the set of parameters;
- a receiver parameter characterization module having as input the test video signal and as output a corresponding set of parameters, the test video signal being a decoded version of the reference video signal derived from the transport stream; and
- a picture quality analysis module having as inputs the two sets of parameters and as output a picture quality rating that represents the degradation of the test video signal with respect to the reference video signal.

4. The analyzer as recited in claim 3 further comprising:

- an encoder having as input the reference video signal and as output the encoded version of the reference video signal in the transport stream; and
- a decoder at the test point having as input the transport stream and as output the test video signal.

* * * * *